United States Patent [19]

Ohkata et al.

[11] Patent Number: 4,838,842
[45] Date of Patent: Jun. 13, 1989

[54] PULLEY IN WHICH CERAMIC PARTICLES ARE EXPOSED ON THE SURFACE

[75] Inventors: Ichizo Ohkata, Kamakura; Hiroshi Takahashi, Yokohama, both of Japan

[73] Assignee: Kato Hatsujyo Co., Ltd., Yokohama, Japan

[21] Appl. No.: 136,299

[22] Filed: Dec. 22, 1987

[30] Foreign Application Priority Data

Mar. 31, 1987 [JP] Japan .............................. 62-48387[U]

[51] Int. Cl.$^4$ ............................................. F16H 55/48
[52] U.S. Cl. ...................................... 474/192; 428/148
[58] Field of Search ............... 474/192, 190, 167, 174, 474/184; 428/148

[56] References Cited

U.S. PATENT DOCUMENTS

| | | | |
|---|---|---|---|
| 662,046 | 11/1900 | Winter | 474/184 |
| 2,643,549 | 6/1953 | Whitesell | 474/192 |
| 2,836,982 | 6/1958 | Voss et al. | 474/192 X |
| 3,666,613 | 5/1972 | Beninga | 152/210 X |
| 3,958,063 | 5/1976 | Robson | 428/148 X |

Primary Examiner—Thuy M. Bui
Attorney, Agent, or Firm—Ladas & Parry

[57] ABSTRACT

A pulley composed of a composite material in which hard particles are dispersed in a matrix material, in which a part of the hard particles is exposed to the outside by removal of the matrix material at the pulley surface.

2 Claims, 3 Drawing Sheets

4,838,842

PULLEY IN WHICH CERAMIC PARTICLES ARE EXPOSED ON THE SURFACE

BACKGROUND OF THE INVENTION

1. Field of the Invention

The present invention relates to a driving device for use in small office automation equipment or the like, and in particular to a driving pulley for a steel belt.

2. Related Background Art

For office automation equipment there is desired a compact and light pulley, in consideration of dimension of the equipment. For this reason there have been employed pulleys made of light metals. Also for driving such pulley there has been employed a steel belt for preventing elongation by fatigue, since a twisted wire belt or a rubber belt results in an elongation after prolonged use, thus deteriorating the precision of belt position.

The surface of such pulley should have a high hardness in order to increase the abrasion resistance. For this purpose, there is already proposed a pulley having a thin film of a hard metal on the belt driving surface, as disclosed in the Japanese Utility Model Laid-open No. 29148/1972. However such pulley tends to show a small friction resistance, in engagement with a mirror-finished steel belt, thus eventually resulting in slippage.

Also the Japanese Patent Publication No. 44684/1982 disclosed a process of mechanically finishing the surface of an aluminum pulley and depositing a suitable amount of an extremely hard material such as chromium oxide, alumina, tungsten or tungsten carbide on said surface by melt spraying, thereby obtaining a high hardness and a high friction on said surface.

However such forced spraying of chromium oxide, alumina etc. on the surface of pulley inevitably leads to an inexact external diameter of the pulley, and such uneven dimensional accuracy gives rise to defective frictional drive for the steel belt.

SUMMARY OF THE INVENTION

An object of the present invention is to provide a pulley which is small in size, light in weight, has a high abrasion resistance at the surface and a high friction on the belt driving surface.

Another object of the present invention is to provide a pulley having a uniform eternal diameter and adapted for mass production.

DETAILED DESCRIPTION OF THE PREFERRED EMBODIMENTS

In consideration of the foregoing, the present invention is to provide a pulley capable, even in combination with a mirror-finished steel belt with a low friction resistance, of generating a large friction resistance on the pulley surface by exposing hard materials of a high friction resistance by the etching of the surface thereby obtaining stable and reliable driving power.

This object can be achieved by forming a pulley with a mixture of a metal or resin matrix material and hard particles for example of ceramic material, and etching the surface of said pulley to partially expose said hard particles.

Figure 1:
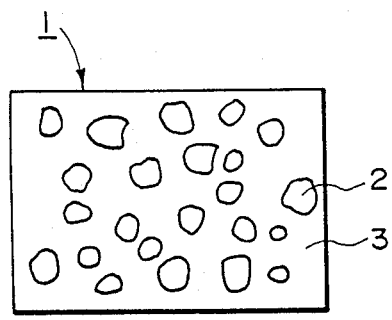
FIG. 1 is a font view of a pulley embodying the present invention.

This invention will now be clarified in greater detail by the embodiments shown in the attached drawings. At first, as shown in FIG. 1, ceramic particles 2 are mixed in a metal matrix 3, for example aluminum metal. In this operation the aluminum 3 is formed as granules of suitable size, and the ceramic particles 2 of a particle size of 50 to 300 microns are mixed. The mixing ratio is about 30%. The above-mentioned range of particle size provides an almost constant result in the measurement of friction coefficient, and is therefore most preferable for use and for manufacture.

Figure 2:
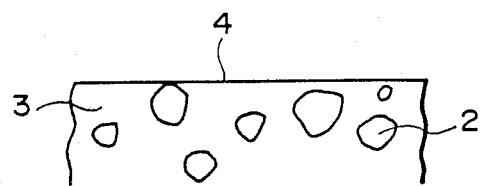
FIG. 2 is a schematic view showing a state of mixture of metal matrix and ceramic material.
Figure 3:
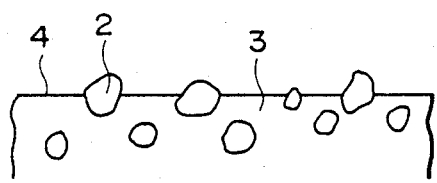
FIG. 3 is a schematic view showing a state in which the ceramic material is exposed t the surface by dissolving the surface of the metal matrix.

In practice, as shown in FIG. 2, ceramic particles 2 of predetermined particle size are collected by passing a suitable filter, and are mixed in the metal matrix 3. The metal matrix 3 is preferably composed of a low-melting metal such as aluminum, but other metals such as magnesium, zinc or copper may also be employed in consideration of the ease of manufacture.

The ceramic particles 2 are mixed, with a mixing ratio of about 30%, into the metal matrix 3, and the mixture is then fused by heating in a high-frequency electric furnace. By such heating, the metal matrix 3 is fused and turns to liquid in a stage mixed with said ceramic particles 2.

Then the liquid metal matrix 3 is poured in a metal mold and cooled. The size of the pulley is determined by said metal mold.

Said pulley 1 has smooth surface obtained by casting in the mold, and the metal matrix 3 of said surface is etched with a chemical agent to obtain a friction resistance on said surface.

For example, aluminum metal 3 in the present embodiment is dissolved, while partially exposing the ceramic particles 2 on the surface, by immersion in aqueous solution of sodium hydroxide.

Thus the exposed amount of the ceramic particles 2 is determined by the mixed amount thereof, and the members providing the friction resistance are formed in this manner.

Figure 4:
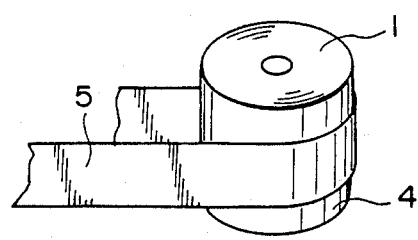
FIG. 4 is a perspective view of the state of use in which a metal belt engages with a pulley.

FIG. 4 shows a state in which a metal belt 5 is wound around the pulley 1 thus formed. The mirror-finished surface of the metal belt 5 and the surface of the pulley 1, maintained in contact during rotation, do not cause mutual slippage but can achieve stable driving due to the friction resistance of the surface 4 of the pulley.

The surface 4 of the pulley 1 is made coarse by the presence of the ceramic particles 2 and generates a friction resistance in contact with the surface of the belt 5 by means of the irregular coarse surface, thus obtaining stable driving capability.

Since the pulley 1 is formed by molding with molten metal, the exposed ceramic particles 2 have a uniform exposed height over the entire surface, and said exposed height is small, so that the metal belt 5 is not damaged by said particles.

Consequently there can be constantly obtained stable driving performance.

Though the foregoing explanation has been limited to aluminum metal, similar results can be obtained with other soft metals or resin materials. Also the ceramic material may be replaced by similar hard materials, and the present invention can therefore be modified in various manners within the scope and spirit of the appended claims.

In the following there will be explained a second embodiment of the present invention.

Figure 5:
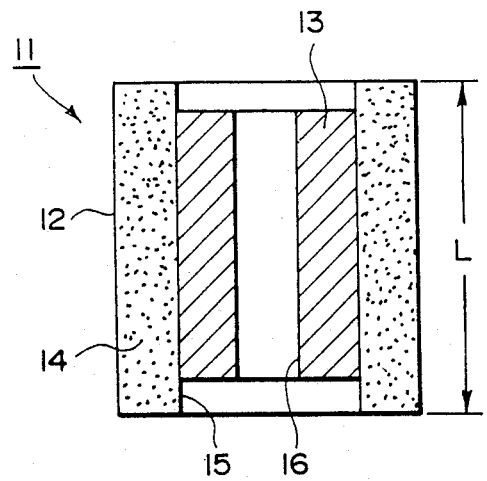
FIG. 5 is a cross-sectional view of the second embodiment of the pulley of the present invention.
Figure 6:
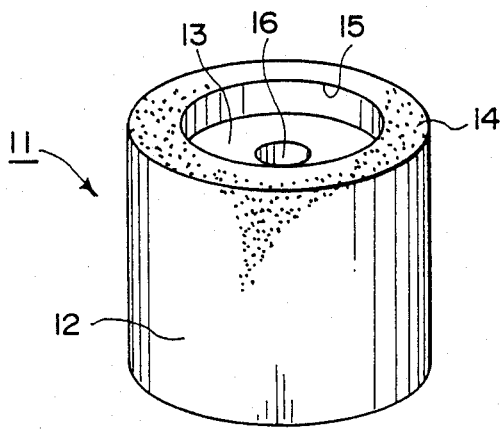
FIG. 6 is a perspective view thereof.

As shown in a cross-sectional view in FIG. 5 and a perspective view in FIG. 6, a pulley 11 of the second embodiment is composed of a cylindrical composite member 12 of a predetermined width L composed of a light metal or a resinous material incorporating powdered hard material 14 in a similar manner as in the foregoing embodiment, and a bearing portion 13 consisting of a core member inserted in a penetrating hole 15 of said cylindrical composite member 12.

Figure 7:
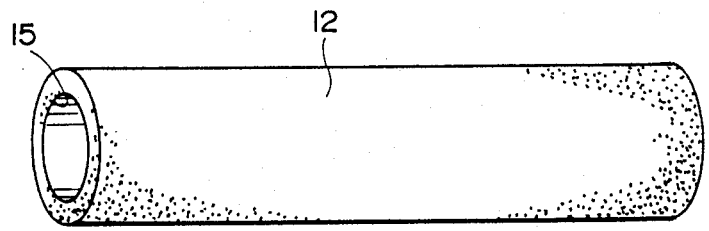
FIG. 7 is a schematic view of a cylindrical composite in extrusion molding.

More specifically, said cylindrical composite member 12 is obtained by fusing light metal or resin chips in which the powdered hard material 14 such as alumina or tungsten carbide is mixed, and extruding the fused material in a long form as shown in FIG. 7 from an extrusion molding machine.

Such integral molding of a long cylindrical member allows to obtain pulleys with uniform internal and external diameters in mass production.

Among the above-mentioned powdered hard materials, either one can be selected, according to the molding conditions to be employed.

The bearing portion 13 is molded with a resin material, by means of a mold of a width corresponding to that of the pulley 1, in such a manner that the external diameter becomes equal to the internal diameter of said cylindrical composite member 12 and that a penetrating hole 16 is formed in the center.

The hole 16 at the center of said bearing portion 13 serves for accepting a shaft when the completed pulley 11 is rotated.

Figure 8A:
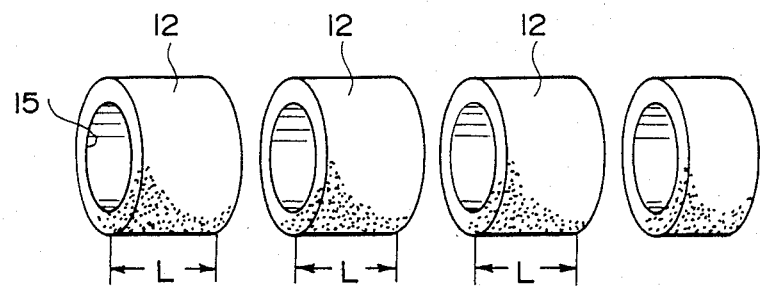
FIG. 8A is a schematic view showing the cutting of said composite material into a predetermined dimension.

For mutually combining the molded parts 12 and 13, the composite member 12 is cut to pieces of a predetermined width L as shown in FIG. 8A.

The cutting may be achieved with a diamond cutter since the mixed powdered hard material 14 has a high hardness.

Figure 8B:
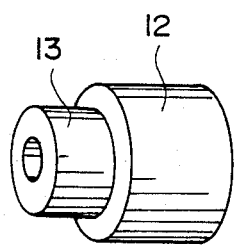
FIG. 8B is a schematic view showing the combination of said composite material with a bearing portion.

Then, as shown in FIG. 8B, the bearing portion 13 is pressed into the penetrating hole 15 of the composite member 2 which is already cut as explained above. The width of said bearing portion 3 is selected equal to or slightly smaller than the width L of the composite member 2.

Figure 8C:
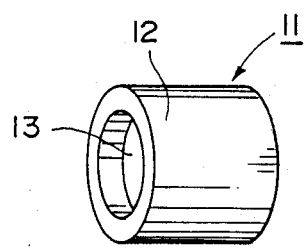
FIG. 8C is a view of completed pulley.

Through these steps an independent pulley 11 as shown in FIG. 8C can be obtained.

Also in this embodiment powdered hard particles are exposed to increase the friction resistance, by etching the matrix material on the surface of the pulley with a chemical agent or the like, as already explained in the first embodiment.

As explained in the foregoing, the pulley of the present embodiment can be mass produced inexpensively with uniform performance, as it is composed of a composite member and a bearing portion, both of which can be obtained by mass production by means of molding operation.

Also the presence of powdered material mixed in the composite member constituting the pulley provides a high hardness and ensures a high abrasion resistance, thereby significantly extending the service life of the pulley.

On the other hand, the resin core member inserted into the pulley allows to reduce the weight thereof and to economize the matrix material and the powdered hard material.

Furthermore, in contact with a metal belt, there is generated a friction resistance between the pulley and said belt, and said resistance prevents the slippage and always ensures stable driving performance. This fact is important in the use of the office automation equipment an in the protection of the belt.

What is claimed is:

1. A pulley comprising a cylindrical outer ring composed of a composite material in which ceramic particles 50 to 300 microns in size are dispersed substantially 30% by weight in a matrix material of low melting point metal, said ceramic particles being exposed on the surface of said cylindrical member; and a bearing member made by light metal or resin material said bearing member being firmly inserted into a penetrating hole of said outer ring.

2. A pulley comprising a cylindrical shaped outer ring and bearing member firmly inserted into a penetrating hole of said outer ring, said pulley being made by a method including the steps of heating and melting matrix metal material having low melting point mixed with ceramic particles of 50 to 300 microns in size, the ceramic particles comprising substantially 30% in weight of the mixture, molding an elongated cylindrical part from the mixture, removing the matrix material on the cylindrical part to expose the ceramic particles by chemical etching, cutting the elongated cylindrical part into the outer ring with predetermined width, and firmly inserting a bearing member into a penetration hole in said outer ring.

* * * * *